3,490,292
ACCELERATION MEASUREMENT AND
RECORDING DEVICE
Lawrence C. Simmons, Cleveland, Ohio, assignor to
Cleveland Technical Center, Inc., Cleveland, Ohio, a
corporation of Delaware
Filed Dec. 20, 1967, Ser. No. 692,105
Int. Cl. G01p 15/04
U.S. Cl. 73—492                                    3 Claims

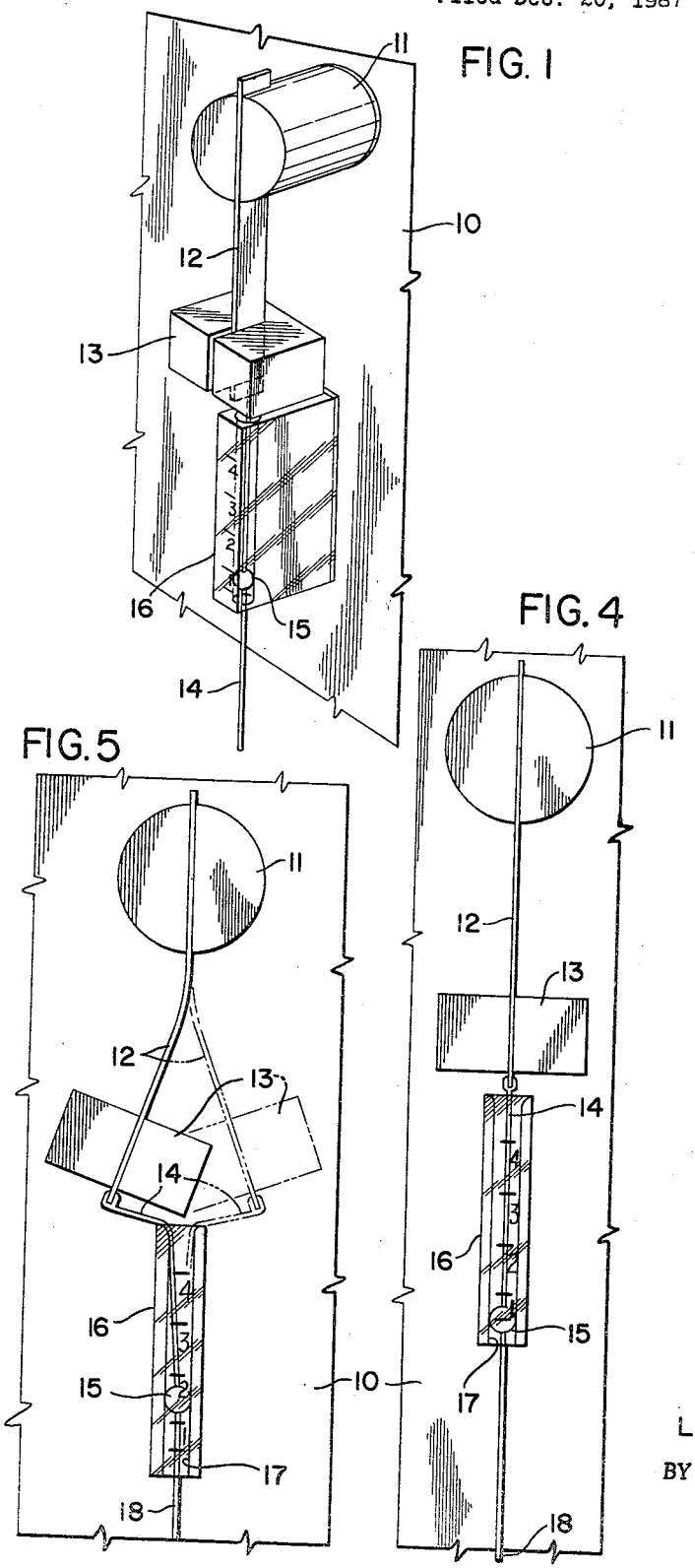

ABSTRACT OF THE DISCLOSURE

A device for measuring and recording the maximum acceleration experienced by an object in motion. The device utilizes a leaf spring with a free end carrying a weight and adapted to deflect in response to an acceleration. A measuring element is connected to a length of string fastened to the free end of the leaf spring and is limited to a confined path of travel in a holding device which keeps the element in an indicating position when it is pulled along the path by the length of string in response to deflection of the leaf spring.

BACKGROUND OF THE INVENTION

This invention relates to devices for measuring and recording acceleration and especially to such devices that measure and record the maximum acceleration of an object to which the device is attached during a given period. As used herein, "acceleration" is intended to mean rate of change of velocity whether the velocity is increasing or decreasing and examples of accelerations measured are those deriving from sudden jolts and shocks due to abrupt starting and stopping of a vehicle in which the object is being transported.

One prior art device of this type is shown in U.S. Patent No. 3,269,191, which shows a device for measuring and recording the maximum acceleration experienced for example by a cargo container being transported by rail. The device utilizes an essentially vertical leaf spring connected at its upper end to a support, and a weight mounted on the spring below the support to deflect in response to either positive or negative acceleration. The measurement and recording of the amount of spring deflection is accomplished by two generally oppositely extending strings connected to the free end of the spring and extended through retaining devices which permit one of the strings to slide therethrough when pulled. Each string is initially pulled taut and when the spring is deflected by an acceleration in a direction tending to pull the string, the string moves through its retaining device an amount depending on the magnitude of the acceleration.

Accordingly, the length increment of the string which has been pulled through the retaining device during transportation of the cargo container on which the device is mounted indicates the maximum acceleration experienced by the container and contents during transit.

As indicated in U.S. Patent No. 3,269,191, devices of this type have particular utility in connection with the transporting of freight such as by rail, truck or aircraft where liability claims may arise for damage to the freight while in the custody of the carrier. By using a device to measure and record the maximum shock experienced during transit, the carrier can more accurately decide the likelihood that damage to freight actually was caused by shocks and jolts experienced in transit.

While precise readings are not absolutely necessary it is desirable that the recorded measurement be capable of reasonably accurate reading within the operational limitations of the device itself and that some convenient means be provided for translating the reading to standard acceleration units. While the device of Patent No. 3,269,191, is effective in many ways, it is not as capable as may be desired in making possible a rapid, reasonably accurate reading since the length of string between the free end of the leaf spring and the retaining device usually must be determined by visual estimation and is thus subject to errors. Furthermore, because of the lateral movement of the strings, this device occasionally requires more room for mounting than is available.

The device of the present invention however substantially reduces the difficulties indicated above and affords other features and advantages not obtainable from the prior art.

SUMMARY OF THE INVENTION

An object of the invention is to measure and record the maximum acceleration experienced by an object in a manner which may be quickly interpreted by visual inspection.

Another object is to provide a reasonably accurate recorded measurement of the maximum acceleration and hence the maximum shock resulting from such acceleration experienced by an object, which measurement may be readily translated to predetermined units.

These and other objects are accomplished by the device of the invention wherein a leaf spring having one end fixed relative to the object to which an acceleration may be applied, and a free end adapted to be deflected in the direction of an acceleration, is provided with an inertial mass which serves to deflect the spring in response to an acceleration experienced by the object. A measuring element is connected to the free end of the leaf spring by an initially taut length of flexible string and means are provided for limiting the movement of the measuring element to an essentially linear path of travel and also for holding the element at a position to which it has been pulled in the path by the string in response to deflection of the free end of the spring.

In the preferred embodiment the confined path of travel is colinear with the leaf spring when unflexed so that the initial deflection of the free end of the spring in any direction immediately pulls the measuring element to a position indicating a specific acceleration magnitude, in which position the measuring element is held unless it is pulled further due to an acceleration of a still higher magnitude.

According to one embodiment the measuring element is a ball formed of resilient material and the means for limiting the movement of the ball to a confined path of travel is a transparent block having a bore with an inner diameter slightly smaller than the diameter of the ball.

Other objects, uses and advantages will appear from the following detailed description and drawings which illustrate a preferred embodiment of the invention.

BRIEF DESCRIPTION OF THE DRAWINGS

FIGURE 1 is a perspective view showing an acceleration measuring and recording device embodying the invention;

FIGURE 2 is a side elevational view of the device of FIGURE 1;

FIGURE 3 is a cross-sectional view taken on the line 3—3 of FIGURE 2;

FIGURE 4 is a front elevational view of the device of FIGURE 1; and

FIGURE 5 is a front elevational view similar to FIGURE 4 showing the operation of the device when subjected to an acceleration.

DESCRIPTION OF THE PREFERRED EMBODIMENT

Referring more particularly to the drawings there is shown one form of acceleration measuring and recording device embodying the invention and secured to a vertical wall 10 of an object to be subjected to acceleration, such as a cargo container. The device includes a mounting member which in this case is a cylindrical cork 11 having one end secured to the wall 10. The outwardly extending end of the cork has a slot cut therein which receives one end of a leaf spring 12. This provides a fixed support for the spring 12 at one end and leaves the other end free to flex. An inertial mass or weight 13 is secured to the free end of the leaf spring 12 and serves to deflect the leaf spring (FIGURE 5) in response to acceleration transverse to the plane of the spring 12. Accordingly the device is mounted on a vertical side of a particular object in such a manner that the spring will be flexed or displaced in the direction of the acceleration to be expected.

A length 14 of flexible strand, string, cord or other relatively inextensible, flexible material is connected at the bottom end or free end of the leaf spring 12. For the purpose of illustration the term string will be used to describe this flexible length. Secured to the string 14 is a measuring element 15 in the form of a ball made of rubber or other resilient material.

As indicated in the drawings, the string 14 extends downwardly from the leaf spring 12 along the line projected by the leaf spring 12 when in its unflexed or undeflected position as shown in FIGURE 4. This arrangement causes the ball 15 to be pulled upward whenever the weight 13 moves either to the left as shown in solid lines in FIGURE 5 or to the right as shown in dash lines in FIGURE 5, depending upon whether or not the deflection is caused by a positive or a negative acceleration.

The ball 15 is located within and limited to linear movement in a fixed path of travel, which in this case is vertical, by means of a holding element 16 preferably formed of transparent material. The holding element 16 has a longtitudinal bore extending therethrough in which the ball 15 is snugly received. The fit between the resilient ball 15 and the walls of the bore 17 is sufficiently tight that the ball is gripped or held by friction at any particular location in the bore to which it might be pulled by the string 14.

Referring to FIGURE 5 it will be seen that when the leaf spring is deflected either to the left (solid lines) or to the right (dot-dash lines), the upper end of the string will be displaced to the left or right of the upper end of the element 16 through which the string 14 extends and accordingly the string will pull the ball 15 upward to a new indicating position depending upon the amount of deflection or displacement. Since the deflection is dependent upon the magnitude of the acceleration, the position of the ball provides an indication of the relative magnitude of the acceleration applied.

For the purpose of providing a visual indication of the magnitude of the acceleration experienced by the object, the front face of the element 16 may be provided with a graduated scale. The scale may be graduated in standard acceleration units such as the g (g is the acceleration of gravity or about 32.2 feet per second per second); however, it is more convenient to merely provide a linear scale with graduations spaced according to the accuracy limitations of the device itself. Then a reading may be translated from the scale indication to a given range of standard acceleration units by means of a table which may be supplied to the person reading and recording the measurements.

OPERATION

The illustrated device is used as follows:

The parts are fastened to the vertical surface 10 on a cargo container to be shipped for example by rail and which is likely to be subjected to jolts and shocks due to abrupt starting and stopping as well as during the coupling of freight cars to one another. This fastening is accomplished by securing the cork 11 to the surface with cement, adhesive, or the like, securing the end of the leaf spring 12 in the slot in the outer end of the cork 11, and securing the weight 13 to the free end of the spring 12. The element 16 is then secured to the surface 10 with the lower end of string 14 pulled therethrough together with the ball 15. The element 16 is positioned so that the bore 17 is colinear with the spring 12 and so that the ball 15 is centered at the lowermost index mark on the scale. The location must of course be such that the acceleration resulting from jolts and shocks will be in the direction in which the spring deflects.

When the cargo container is subjected to jolts or shocks the weight 13 will cause the leaf spring 12 to deflect in a direction opposite to the direction of the acceleration, the deflection having a maximum magnitude determined by the mass of the weight 13, the resiliency of the spring 12, the distance between the weight 13 and the cork 11 and the magnitude of the acceleration itself. The resulting generally arcuate movement of the weight 13 (FIGURE 5) pulls the string 14 through the element 16 and thus raises the resilient ball 15 to a higher position indicated on the scale 16. Each time the cargo container is subjected to an acceleration of a greater magnitude, the ball 15 will be raised to a new height in the bore 17 so that at the end of a given time interval such as the duration of the container's trip from origin to destination, the magnitude of the maximum acceleration experienced in transit will be reflected by the position of the bell in the bore 17.

It is apparent that devices embodying the invention can have different proportions and dimensions than those disclosed such as for example the bore 17 or other path defining member need not be vertical but rather may be positioned in a variety of diagonal or horizontal positions. Also the free end of the spring need not extend downward but could extend upward if desired. Due to the unique construction of the device it may be assembled and installed at very low cost so as to permit it to be discarded if desired after only one use. Also due to the use of a resilient ball and a transparent element 16 it is possible to obtain fairly accurate and consistent measurements and also to visually interpret the recorded measurement quickly and within the relative limits of accuracy afforded by the device itself.

While the invention has been illustrated and described with respect to a specific embodiment thereof, it will be understood that variations and modifications may be made in the form and arrangement of the several parts and elements thereof without departing from the spirit of the invention. The invention therefore is not to be limited to the particular structure and mechanism herein shown and described nor in any manner inconsistent with the extent to which the progress in the art has been advanced by the invention.

I claim:

1. Apparatus for measuring and recording the maximum acceleration experienced by an object in motion, comprising:

a leaf spring having a fixed end relative to said object and a free end adapted to be deflected in the direction of an acceleration experienced by said object,
an inertial mass carried by and adapted to deflect said spring in response to an acceleration,
a length of flexible string connected to said free end,
a measuring element formed of resilient material connected to said string, and
a holding element fixed to said object and having a passage therein with an open end thereof adjacent said free end of said leaf spring, which passage receives said string and said measuring element, for limiting the travel of said measuring element to a predetermined path substantially perpendicular to said acceleration, and for frictionally holding said element at a readily visible position to which it has been pulled in said path by said string in response to deflection of said free end of said spring.

2. Apparatus as defined in claim 1 wherein said measuring element is a ball formed of resilient material.

3. Apparatus as defined in claim 2 wherein said limiting and holding means is a transparent element having a bore therein of a diameter slightly smaller than the diameter of said ball.

References Cited

UNITED STATES PATENTS

| 2,049,532 | 8/1936 | Williams | 73—396 |
| 3,269,191 | 8/1966 | Simmons | 73—492 |
| 3,097,534 | 7/1963 | Pasieka | 73—492 |

JAMES J. GILL, Primary Examiner

H. GOLDSTEIN, Assistant Examiner

U.S. Cl. X.R.

116—114